United States Patent [19]

Asmussen et al.

[11] Patent Number: 4,698,376

[45] Date of Patent: Oct. 6, 1987

[54] COATING MATERIAL FOR COLLAGEN-CONTAINING MATERIALS

[75] Inventors: Erik Asmussen, Farum; Christian Munksgaard, Kokkedal, both of Denmark

[73] Assignee: Bayer Aktiengesellschaft, Leverkusen, Fed. Rep. of Germany

[21] Appl. No.: 839,758

[22] Filed: Mar. 14, 1986

[30] Foreign Application Priority Data

Mar. 23, 1985 [DE] Fed. Rep. of Germany ....... 3510611

[51] Int. Cl.[4] ................................................ A61K 6/08
[52] U.S. Cl. ...................................... 523/115; 106/35; 260/998.11; 433/228.1; 526/208
[58] Field of Search ..................... 523/115; 433/228.1; 526/208; 106/35; 260/998.11

[56] References Cited

U.S. PATENT DOCUMENTS

| | | | |
|---|---|---|---|
| 4,148,988 | 4/1979 | Masuhara et al. | 526/318 |
| 4,407,984 | 10/1983 | Ratcliffe et al. | 522/14 |
| 4,437,836 | 3/1984 | Schmitz-Josten et al. | 522/14 |
| 4,457,818 | 7/1984 | Denyer et al. | 522/28 |
| 4,459,193 | 7/1984 | Ratcliffe et al. | 522/24 |

FOREIGN PATENT DOCUMENTS 0124659 11/1984 European Pat. Off. .
0141324 5/1985 European Pat. Off. .

*Primary Examiner*—Robert A. Wax
*Attorney, Agent, or Firm*—Sprung, Horn, Kramer & Woods

[57] ABSTRACT

The present invention relates to formulations which are useful as coating materials for example as an undercoating material or lacquer to improve the bonding between collagen-containing materials and hardening polymeric materials. The formulations contain an active ketone and an olefinically unsaturated monomer which has an active hydrogen.

9 Claims, No Drawings

COATING MATERIAL FOR COLLAGEN-CONTAINING MATERIALS

The invention relates to formulations which can be used as coating material, for example as undercoating material (primer or liner) or lacquer to improve the bonding between collagen-containing materials and hardening polymeric materials.

Especially in dentistry, hardening polymeric materials are used as filling materials in dental repairs. In general, the preferred hardening polymeric materials are fillings based on acrylates. However, these polymeric fillings have the disadvantage that their permanent adhesion to the dentine is poor. In order to solve this problem, to date partial undercutting of dentine has been carried out; for this purpose, it was necessary to remove considerable amounts of fresh dentine beyond the area which had been attacked.

In another method, the dentine and the enamel surface are superficially etched with acids such as, for example, phosphoric acid, and then the filling is carried out. Apart from the fact that the acids exert an irritant effect in the region of the mouth, they also readily penetrate through the dentine canals into the tooth and damage the nerve (pulp).

J. Dent. Res. 57, 500–505 (1978) discloses methacrylates of the isomeric hydroxybenzaldehydes, containing aldehyde groups, which can be used as undercoatings for fillings in dentistry. However, the bonding between the dentine and the filling composition is still unsatisfactory even after undercutting of this type.

Undercoating agents comprising aqueous formaldehyde or glutaraldehyde and β-hydroxyethyl methacrylate (HEMA) are described in Scand. J. Dent. Res. 92, 980–983 (1984) and J. Dent. Res. 63, 1087–1089 (1984).

Formulations for the coating of collagen-containing materials have now been found, which formulations contain active ketone and olefinically unsaturated monomers having active hydrogen.

The formulations according to the present invention result in an unexpected particularly strong bonding between the collagen-containing material and the hardening polymeric material. They have no adverse effect either on the gum or the dentine and are outstandingly suitable for use in dentistry.

The active ketones according to the invention have a medium dielectric constant.

Particularly preferred active ketones are those of cyclic aliphatic hydrocarbons. Cyclic aliphatic hydrocarbons may, according to the invention, be cyclopentane, cyclohexane and cycloheptane rings. In this context, preferred ketones are those of optionally substituted cyclopentanes of the formulae

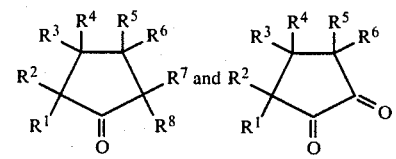

in which $R^1$ to $R^8$ are identical or different and denote hydrogen, alkyl ($C_1$ to, say, $C_6$) or aryl (C6 to $C_{12}$).

It is possible for further aliphatic 5- to 7-membered hydrocarbon rings, in particular a cyclopentane or cyclohexane, and/or aromatic rings, in particular the phenyl ring, to be fused onto these hydrocarbon rings, where appropriate. Of course, it is possible for the active ketones to be substituted by further radicals, for example lower alkyl radicals ($C_1$ to, say, $C_6$).

Particularly preferred active ketones are also those of aromatic hydrocarbons. Aromatic ketones may, according to the invention, be benzophenone, diphenyl ketone, 1-phenyl-2-propanone or 1,3-diphenyl-2-propanone.

The ketones according to the invention can carry one or more, preferably one or two, aryl groups.

Examples of active ketones which may be mentioned are: cyclopentanone, benzophenone, cyclohexanone, 2,4-pentanedione and camphoroquinone.

Preferred active ketones are cyclopentanone and camphoroquinone.

Olefinically unsaturated monomers having active hydrogen (Brönsted acid) may, according to the invention, be acrylic esters, methacrylic esters and urethanes of acrylic acid and methacrylic acid having OH, $NH_2$, NH, SH or PH groups, preferably OH, NH and $NH_2$ groups.

The following monomers may be mentioned as examples:

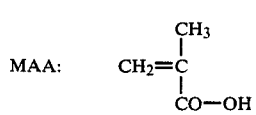

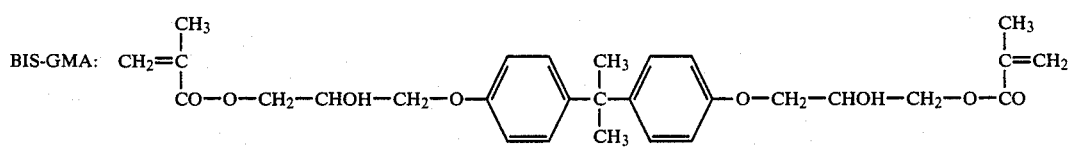

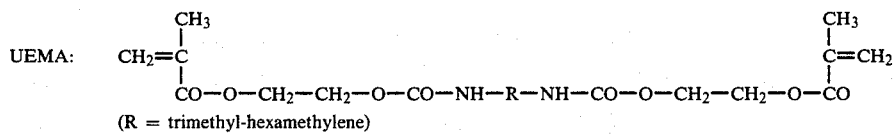

(R = trimethyl-hexamethylene)

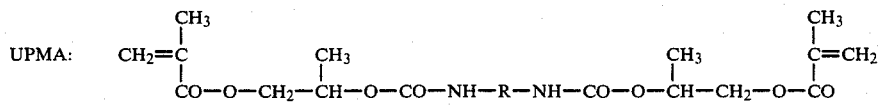

(R = trimethyl-hexamethylene)

It is possible that, in addition to the olefinically unsaturated monomers having active hydrogen, the formulations according to the invention may also contain as additive olefinically unsaturated monomers having no active hydrogen. These can also be acrylic esters, methacrylic esters and urethanes.

The following monomers may be mentioned as examples:

BUMA: 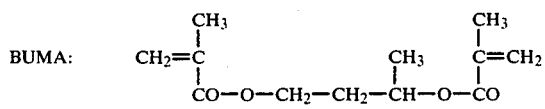

BIS-PMA: 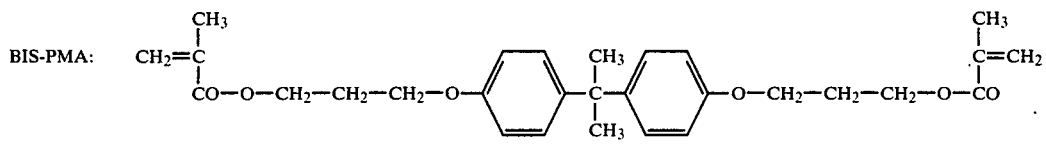

BIS-MA: 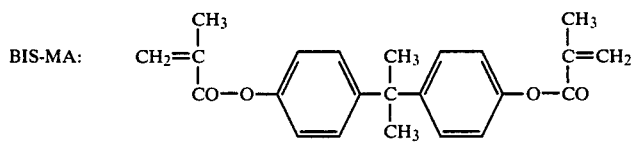

EGD-MA: 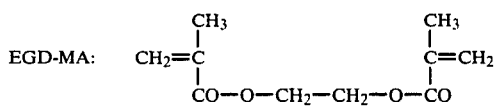

DEG-MA: 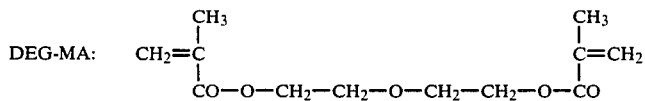

TEG-DMA: 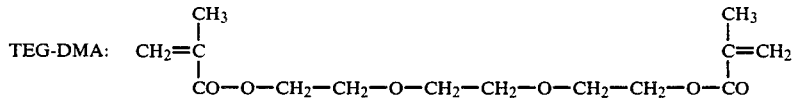

BIS-EMA: 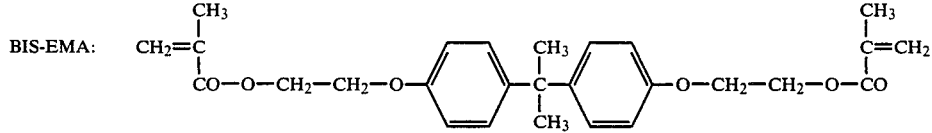

MMA: 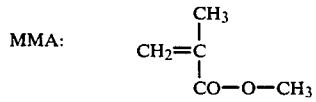

The formulations according to the invention can, where appropriate, contain water and/or organic solvent.

The components of the present formulation can be dissolved in an organic solvent for use. Any physiologically suitable organic solvent can be used. Examples of such organic solvents are: acetone, ethanol and ethyl acetate.

Formulations according to the invention in aqueous solution are particularly preferred.

The formulations according to the invention can, in general, contain 0.01 to 10 mol of the active ketone relative to 1 mol of the olefinically unsaturated monomer having active hydrogen. Preferably, the formulations according to the invention contain 0.1 to 0.3 mol of the active ketone, relative to the monomer.

The formulations according to the invention can, in general, contain 0 to 100 parts by weight of water and/or organic solvents relative to 1 part by weight of the mixture of the active ketone and the olefinically unsaturated monomer having active hydrogen. Preferably, the formulations contain 1 to 2 parts by weight relative to 1 part by weight of this mixture.

In addition, a process for the preparation of the formulations, according to the invention, for the coating of collagen-containing materials has been found, which process is characterized in that an active ketone and an unsaturated monomer having active hydrogen and, where appropriate, water and/or organic solvents and/or diluents, are admixed with one another.

In general and preferably, the components are mixed with vigorous stirring for the preparation. It is then also possible to apply the components successively or simultaneously to the collagen-containing material, and to prepare the actual formulation on the material which is to be treated.

The applicants believe that the following reaction equations occur when the present formulations is employed:

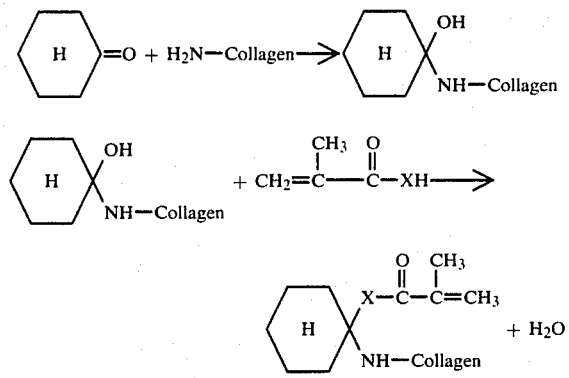

(X denotes a radical having active hydrogen)

The mixing of the components is generally carried out at room temperature, for example in the temperature range 0° to 30° C.

The formulations according to the invention can be used as coating agents, preferably as undercoating material (primer or liner) or lacquer (varnish) in order to improve the bonding between collagen-containing materials and hardening polymeric materials.

Collagen-containing materials are found at many points in the human and animal body. Of course, the use according to the invention relates to living and non-living materials. Collagen-containing materials which may be mentioned are teeth, bones, skin and leather. The formulations according to the invention are preferably used for the coating of teeth for preparing for dental fillings in dental repairs.

The hardening polymeric materials are essentially determined by the area of use. Thus, for example, the only monomers which can be used for polymerization in dentistry are those which are physiologically acceptable and are able to polymerize in the region of the mouth. Monomers of this type for dental fillings are known per se (E. Asmussen. Plastflyldningsmaterialer. of Boghandel, Copenhagen 1981).

Examples of dental fillings which may be mentioned are compositions comprising acrylate and/or methacrylate monomers, suitable catalysts, starters, accelerators and fillers.

When used in dental repair, for example, the formulation according to the invention is applied to the prepared portion of the tooth and, immediately thereafter, the dental filling composition is introduced.

It is possible in this manner to carry out durable and strong dental repairs at unfavourable points, for example on the neck of the tooth. In general, bonding strengths greater than 3 mPa are obtained.

The formulations according to the invention can, surprisingly, be used in aqueous media although the monomers used in the dental filling compositions are extremely sensitive to water. The placing of dental fillings is considerably facilitated by the formulations according to the invention.

EXAMPLES

In the examples, the tensile strength and the shear strength between the dental material and the filling composition are measured.

The coating materials used were the following formulations which contain β-hydroxyethyl methacrylate (HEMA) as the olefinically unsaturated monomer:
- A. 10% by weight of cyclopentanone, 35% by weight of HEMA, 55% by weight of water
- B. 10% by weight of benzophenone, 35% by weight of HEMA, 55% by weight of water
- C. 10% by weight of cyclohexanone, 35% by weight of HEMA, 55% by weight of water
- D. 10% by weight of 2,4-pentanedione, 35% by weight of HEMA, 55% by weight of water,
- E. 15 mg of camphoroquinone, 105 ml of HEMA, 180 ml of water.

Human teeth which have been extracted and stored in a moist condition are used for the test. The teeth are set by casting in epoxy resin; a flat dentine surface is produced by wet grinding. The final grinding is carried out with carbon paper 1000. The surface is then treated with a chelating agent, for example ethylenediaminetetraacetic acid (EDTA-0.5 molar solution, pH 7.4) for 5 seconds.

Coating material A to F is now applied. To dry the surface, drying is carried out with an air-blower for 5 seconds.

To prepare a sample specimen for measurement of the bonding strength, a cylindrical, split Teflon mould is clamped onto the dentine surface which has been treated as described above (Scand. J. Dent. Res. 88, 348-351 (1980)). The filling composition which is introduced is a commercially available synthetic filling material. A No. 016 round drill which is clamped in a hole in a drill holder is attached to the Teflon mold and is pushed from above into the material layer which is still undergoing the hardening process. The complete arrangement is allowed to stand undisturbed at room temperature (23+2° C.) for 10 min, whereupon the drill holder and the Teflon mold are removed and the sample is deposited under water at a temperature of 37+1° C. After 24 hours, the sample with the drill is mounted in an Instron tensile testing apparatus (Scand. J. Dent. Res. 88, 348-351 (1980)); a tensile strength measurement is carried out at a speed of 0.1 cm/min. The tensile strength is calculated by dividing the stress applied at fracture of the filling by the cross-sectional area in the fracture surface of the sample specimen. 5 measurements were carried out on each of the sample specimens.

The shear strength was likewise determined in a manner known per se in the Instron apparatus mentioned. However, the measurement was carried out 1 day after the hardening process.

The results are compiled in the table below:

| Coating material | Bonding strength | |
|---|---|---|
| | Tensile strength | Shear strength |
| A | 10.9 | 6.3 |
| B | | 3.9 |
| C | | 3.3 |
| D | | 3.1 |
| E | | 7.7 |

It will be understood that the specification and examples are illustrative but not limitative of the present invention and that other embodiments within the spirit and scope of the invention will suggest themselves to those skilled in the art.

What is claimed is:

1. A coating composition or lacquer for improving the bonding between collagen-containing material and hardening polymeric materials consisting essentially of an active ketone selected from optionally substituted cycloaliphatic ketones, wherein aliphatic 5- to 7- membered rings and/or aromatic rings may be fused onto the cycloaliphatic ring or aromatic ketones having one or more aryl groups, an ester of acrylic or methacrylic acid having an active hydrogen and water and/or a physiologically suitable solvent.

2. A formulation according to claim 1, which further contains as an additive an olefinically unsaturated monomer having no active hydrogen.

3. A formulation according to claim 1, wherein the olefinically unsaturated monomer having active hydrogen is an ester of acrylic or methacrylic acid, with hydroxyl, imino and/or amino groups.

4. A formulation according to claim 1, consisting essentially of 0.01 to 10 mol of active ketone relative to 1 mol of olefinically unsaturated monomer having active hydrogen.

5. A formulation according to claim 1 consisting essentially of 0 to 100 parts by weight of water and/or a physiogically suitable organic solvent, relative to 1 part by weight of the mixture of active ketone and olefinically unsaturated monomers having active hydrogen.

6. A formulation according to claim 1, wherein the optionally substituted cycloaliphatic ketones are optionally substituted cyclopentanes of the formula

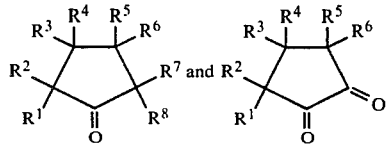

in which $R^1$ to $R^8$ are identical or different and represent hydrogen, $C_1$–$C_6$-alkyl or $C_6$–$C_{12}$-aryl.

7. A formulation according to claim 6, wherein the active ketone is selected from the group consisting of benzophenone, diphenyl ketone, 1-phenyl-2-propanone, 1,3-diphenyl-2-propanone, cyclopentanone, cyclohexanone, 2,4-pentanedione and camphoroquinone.

8. A method of increasing the bonding between a collagen-containing material and a hardening polymeric material wherein the collagen-containing material is initially coated with the formulation of claim 1.

9. A method of preparing a collagen-containing material for application of hardening polymeric materials comprising coating the collagen-containing material with a formulation according to claim 1.

* * * * *

UNITED STATES PATENT AND TRADEMARK OFFICE
CERTIFICATE OF CORRECTION

PATENT NO. : 4,698,376

DATED : October 6, 1987

INVENTOR(S) : Erik Asmussen, et al.

It is certified that error appears in the above-identified patent and that said Letters Patent is hereby corrected as shown below:

Col. 7, line 23          Delete "0" and substitute --1--

Col. 7, line 24          Correct spelling of --physiologically--

Signed and Sealed this

Twenty-fourth Day of May, 1988

Attest:

DONALD J. QUIGG

*Attesting Officer*           *Commissioner of Patents and Trademarks*